United States Patent [19]

Motrenec

[11] Patent Number: 4,566,712
[45] Date of Patent: Jan. 28, 1986

[54] STEERING STABILIZER FOR VEHICLES

[76] Inventor: Donald L. Motrenec, 410 11th St., Huntington Beach, Calif. 92648

[21] Appl. No.: 680,748

[22] Filed: Dec. 12, 1984

[51] Int. Cl.⁴ .............................................. B62K 21/08
[52] U.S. Cl. ....................................... 280/272; 280/90
[58] Field of Search ............................... 280/272–293, 280/89, 90; 188/285, 317

[56] References Cited

U.S. PATENT DOCUMENTS 4,433,852 2/1984 Hon ...................................... 280/272

FOREIGN PATENT DOCUMENTS 2710651 9/1978 Fed. Rep. of Germany .

Primary Examiner—Joseph F. Peters, Jr.
Assistant Examiner—Donn McGiehan
Attorney, Agent, or Firm—Edgar W. Averill, Jr.

[57] ABSTRACT

A steering stabilizer for vehicles of the type having a steerable front wheel or wheels. The stabilizer is positioned in the steering column housing and frame member which is affixed to the frame of the vehicle. The steering column has a threaded portion within the steering column housing and frame member and a piston is threadably held on the threaded portion and moves longitudinally as the wheel is turned. The piston is sealingly held within an oil filled chamber and, as the front wheel is turned, the oil is forced through a passageway thereby damping the turning movement of the front wheel or wheels. Preferably, the size of the passageway is adjustable from the exterior of the stabilizer.

16 Claims, 9 Drawing Figures

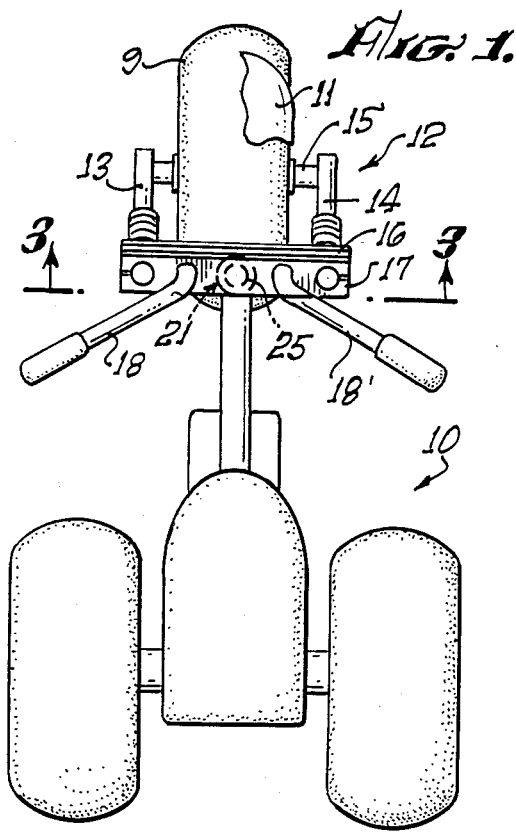
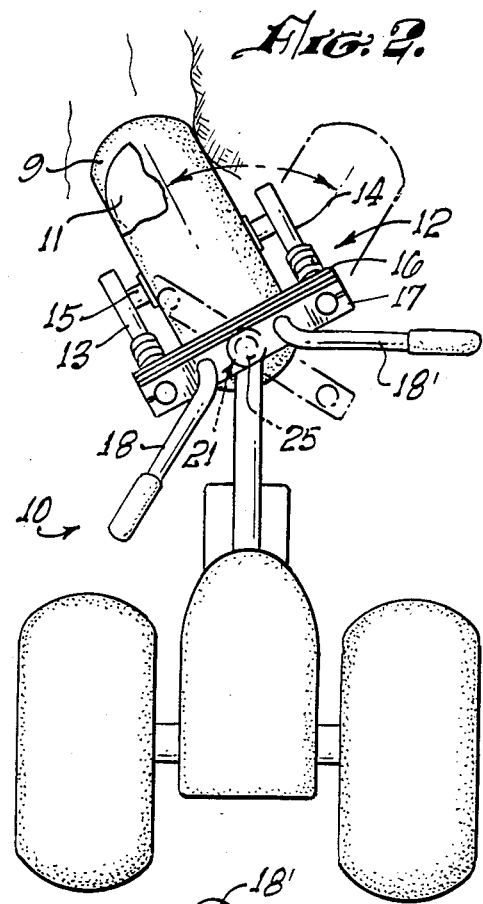
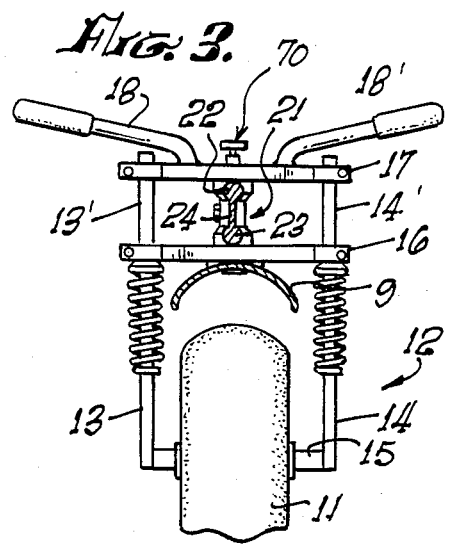
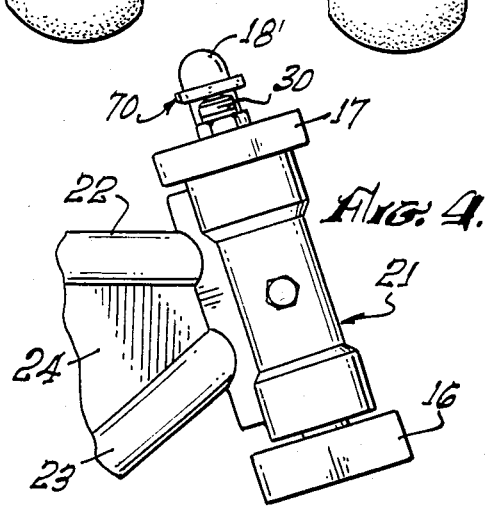

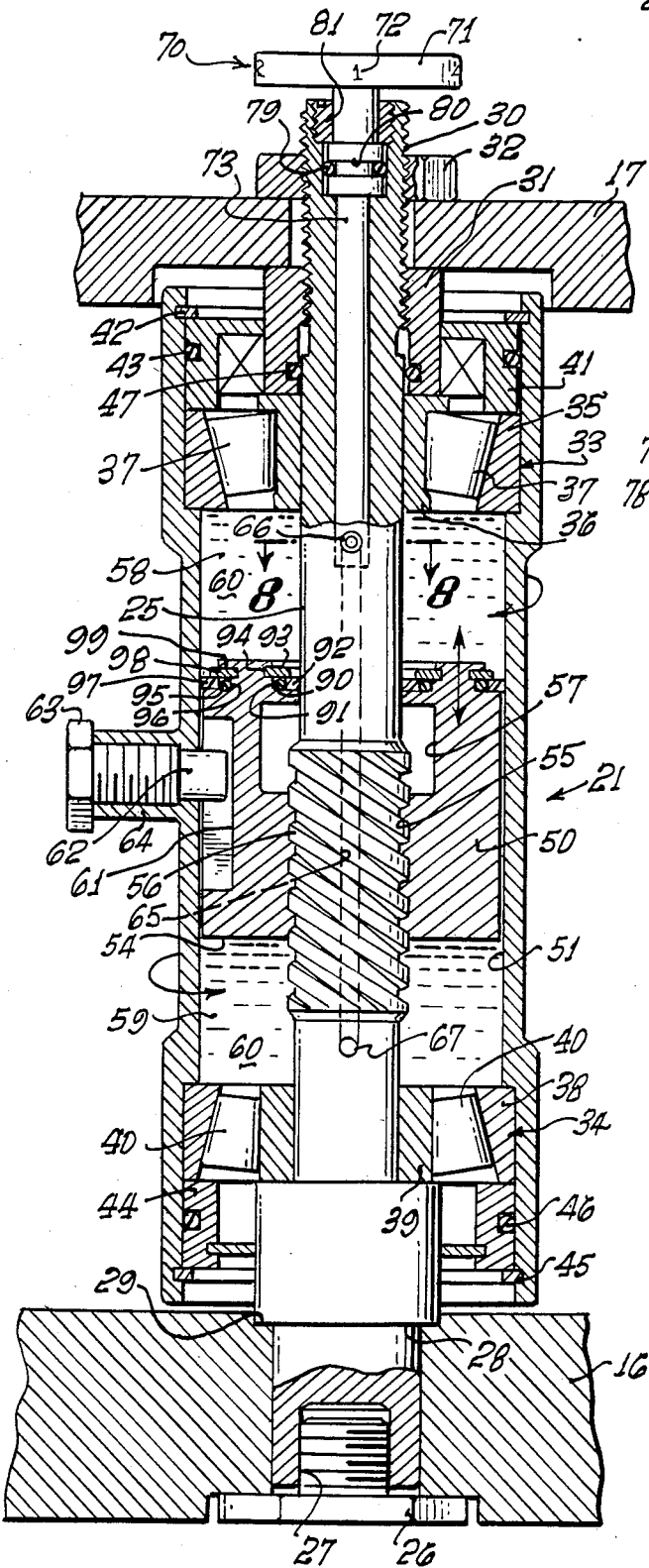
Fig. 5.
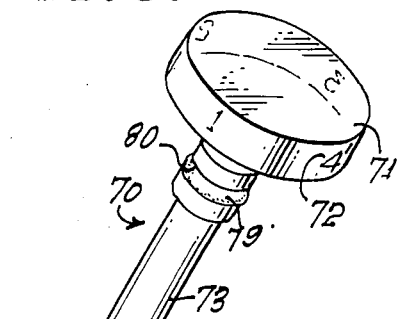
Fig. 6.
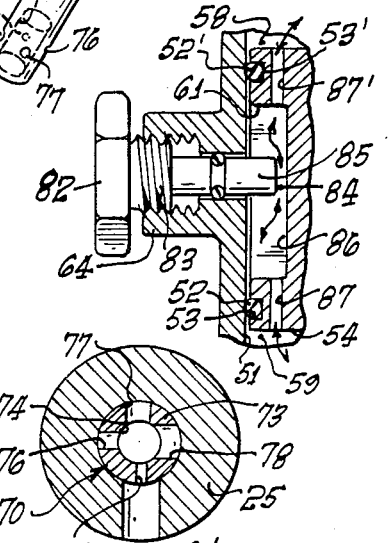
Fig. 7.
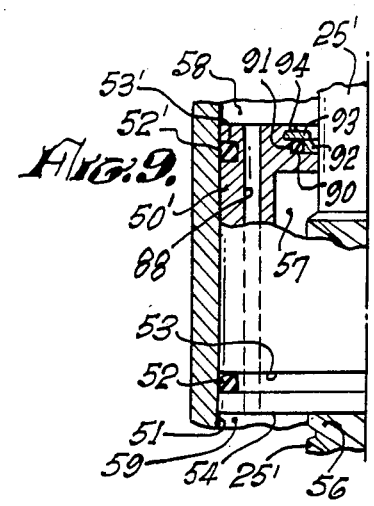
Fig. 8.
Fig. 9.

STEERING STABILIZER FOR VEHICLES

BACKGROUND OF THE DISCLOSURE

The field of invention is motor vehicles and the invention is especially useful on three wheeled vehicles of the type commonly referred to as all terrain vehicles or all terrain cycles. Such vehicles typically have wide wheels and are designed to ride across unpaved terrain. Because of the wide front wheel, bumps in the terrain can often lead to a violent side to side turning of the front wheel which is transmitted through the handlebars to the rider. Such movement causes rider fatigue and discomfort. Four wheel vehicles have also bee developed for off-road use and the present stabilizer is also useful for these vehicles. Furthermore, it is believed that motorcycles used in rough terrain would benefit from the use of the present invention.

The applicant developed a steering stabilizer which is the subject of a pending U.S. patent application entitled "All Terrain Cycle With Steering Stabilizer," filed Sept. 23, 1983, and assigned Ser. No. 535,349. This stabilizer utilized a piston and chamber assembly which was connected to the frame of a three wheeled vehicle at one end and to the triple clamp at the other end. The triple clamp forms a portion of the front wheel assembly and the piston was located away from the center of the triple clamp so that as the front wheel assembly turned, the piston was moved within its chamber causing viscous damping. Although such device is highly effective, it is necessary that space be available between the triple clamp and the frame for installation of the piston. Further refinements of the such vehicles has made this impossible for some models because of the addition of oil coolers, larger fuel tanks and the like.

SUMMARY OF THE INVENTION

It is thus an object of the present invention to provide a steering stabilizer for vehicles which is located in a position which will not interfere with any portion of the vehicle.

It is a further object of the present invention to provide a steering stabilizer having damping characteristics which are adjustable from the outside of the stabilizer.

The present invention is for a steering stabilizer for vehicles of the type having at least one steerable front wheel affixed to a front wheel assembly held by a steering column housing and frame member. The stabilizer includes a steering column housing and frame member affixed to the frame of a vehicle, said housing and frame member having a generally cylindrical chamber axially located therein. The steering column is rotatably held axially within the steering column housing and frame member, said steering column being affixed to the front wheel assembly of the vehicle and said steering column has a threaded portion formed thereon within the steering column housing and frame member. A piston is threadably held on the threaded portion of said steering column within said steering column housing and frame member, said piston being sealed within said generally cylindrical chamber and being axially slideable within said chamber, said piston forming an upper fluid compartment within said chamber above said piston and a lower fluid compartment within said chamber below said piston. Means are provided for preventing the turning of said piston within the generally cylindrical chamber. Oil means are sealingly held within said generally cylindrical chamber, said oil means completely filling said upper and lower fluid compartments. Oil passageway means are positioned between the upper and lower chamber whereby the turning of the front wheel assembly causes the piston to move longitudinally within the generally cylindrical chamber forcing the oil means to pass through said passageway causing viscous damping to the turning of the front wheel assembly. The passageway may comprise an axial bore in the steering column, said axial bore having a first intercepting passageway leading between the axial bore and the upper fluid compartment and a second intercepting passageway between the axial bore and the lower fluid compartment. Adjustment of the resistance to the passage of oil through the passageway may be provided by placement of a plurality of axially directed holes positionable within said first intercepting passageway. Alternatively, the fluid passageway may be combined with the means for preventing the turning of the piston by the adjustment of the length of an alignment bolt within a groove longitudinally formed along one side of the piston.

BRIEF DESCRIPTION OF THE DRAWINGS

FIG. 1 is a schematic plan view of an all terrain vehicle having the steering stabilizer of the present invention installed thereon.

FIG. 2 is a schematic plan view of the all terrain vehicle of FIG. 1 having the steering stabilizer of the present invention mounted thereon.

FIG. 3 is a cross-sectional view taken along line 3—3 of FIG. 1.

FIG. 4 is an enlarged side view of the exterior of the steering stabilizer of the present invention together with a portion of the frame of the vehicle of FIG. 1.

FIG. 5 is an enlarged cross-sectional view of the steering stabilizer of the present invention.

FIG. 6 is a perspective view of the damping adjustment knob of the steering stabilizer of FIG. 5.

FIG. 7 is a cross-sectional view of an alternate embodiment of an adjustment means of the stabilizer of the present invention.

FIG. 8 is an enlarged cross-sectional view taken along line 8—8 of FIG. 5.

FIG. 9 is a cross-sectional view of an alternate embodiment of the piston and steering column assembly of the steering stabilizer of the present invention.

DESCRIPTION OF THE PREFERRED EMBODIMENTS

An all terrain vehicle is shown in schematic plan view in FIG. 1 and identified by reference character 10. Vehicle 10 has a steerable front wheel 11 which is covered by fender 9 and which is connected to a front wheel assembly generally indicated at 12. Wheel assembly 12 has a pair of front forks 13 and 14 which are affixed to the front axle 15 in a conventional manner. A pair of triple clamps comprising a lower triple clamp 16 and an upper triple clamp 17 are also conventional. Upper triple clamp 17 holds a pair of handlebars 18 and 18'.

As shown best in FIG. 3, the upper and lower triple clamps are held together by being clamped on the upper extensions 13' and 14' of front forks 13 and 14. The front wheel assembly is held to the frame of the vehicle by the steering column which is housed within the steering column housing and frame assembly member 21 which is welded to cross bar 22, gusset plate 24 and lower frame bar 23. The turning movement of the front wheel assembly is shown schematically in FIG. 2 and, except for the size and configuration of the steering column, housing and frame member 21 is conventional. However, the action of the steering dampened vehicle is significantly altered by the addition of the stabilizer of the present invention. For instance, when an object is struck as depicted in FIG. 2, the violent or sudden jolt which would otherwise be encountered is substantially reduced by a viscous damping action resulting from the longitudinal movement of a piston within the steering column housing and frame member 21.

One configuration of damper is shown in cross-sectional view in FIG. 5 where it can be seen that steering column 25 is held to lower triple clamp 16 by bolt 26 threaded into a threaded bore 27 at the lower end of column 25. A shoulder 28 of steering column 25 fits in recess 29 formed in the upper surface of lower triple clamp 16. The upper portion 30 of steering column 25 is threaded and upper triple clamp 17 is held between retainer nut 31 and nut 32.

Steering column 25 is held between a pair of tapered roller bearings 33 and 34. Bearing 33 has an outer race 35, an inner race 36 and a plurality of roller bearings 37. Lower bearing 34 has an outer race 38, an inner race 39 and a plurality of roller bearings 40. Bearing 33 is held within the assembly by retainer cup 41 which in turn is held within the assembly by snap ring 42 held within a groove formed in the chamber. An O-ring 43 prevents the leakage of oil around retainer cup 41. Similarly, retainer cup 44 is held against bearing 34 by snap ring 45 and has an O-ring 46 to prevent oil leakage from the unit. Likewise, retainer nut 31 has an O-ring 47 to prevent oil leakage.

Basically, the unit operates by the longitudinal movement of piston 50 within a generally cylindrical chamber 51 formed axially in the steering column housing and frame member 21. Piston 50 has external seal means to prevent fluid leakage between the interior of the piston and the cylindrical chamber 51. This seal means comprises an O-Ring 90 held in a groove 91. A Teflon ring 92 is held in place by a snap ring 93 held in groove 94. An analagous outer seal between piston 50 and steering column 25 comprises an O-Ring 95 held in groove 96. A Teflon ring 97 is held in place by a snap ring 98 held in groove 99. The internal portion of piston 50 has a threaded part 55 which mates with the threaded portion 56 of steering column 25. Piston 50 also has a hollowed out internal bore 57.

Piston 50 defines two compartments namely, an upper fluid compartment 58 and a lower fluid compartment 59. Both of these compartments are filled with oil 60 which passes between upper fluid compartment 58 and lower fluid compartment 59 as described more fully below. Means are provided to prevent the turning of piston 50 within chamber 51. This is brought about by a groove 61 which is cut along one side of piston 50 and which has straight vertical sides which closely fit a retainer pin 62 which is formed at the end of a threaded bolt 63 screwed into a threaded sleeve 64. Groove 61 extends from a point below groove 91 to the bottom of piston 90. A longitudinal bore 65 is drilled along the central longitudinal axis of steering column 25. An upper intercepting passageway 66 permits oil 60 to move from upper fluid compartment 58 into longitudinal bore 65. Oil passes to and from lower fluid compartment through lower intercepting passageways 67.

Thus, it can be seen that the movement of handlebars 18 and 18' causes the steering column to move with respect to the frame which, in turn, causes the longitudinal movement of piston 50 forcing oil to move between the upper and lower fluid compartments 58 and 59 through longitudinal bore 65. This, of course, causes viscous resistance thereby inhibiting the free turning of the front wheel assembly. Since the resistance to movement of a viscous fluid increases dramatically with the rate of fluid flow, violent turning is almost eliminated and yet normal turning may still be easily accomplished.

Although the unit as described above is effective for the intended purpose, further refinement may be provided by providing means for increasing or decreasing the damping force of the unit while the vehicle is use. For instance, one might desire a minimum of steering damping while traversing relatively smooth terrain and a maximum while traveling over rocky portions of terrain. Several methods for accomplishing this external adjustment are shown in FIGS. 5 through 8. An adjustment knob assembly is shown in perspective view in FIG. 6 and has a knob 71 having indicia 72 around the edge thereof. Knob 71 is readily accessible to the rider and adjustment is provided by the turning thereof during operation of the vehicle. Knob assembly 70 has a shaft 73 which has a short axial cylindrical bore 74 at the lower end thereof. Four holes, 75 through 78, pass from bore 74 through shaft 73 as shown in cross-sectional view in FIG. 8. As can be seen in FIG. 8, the turning of knob 71 results in the alignment of one of the four holes with the upper intercepting passageway 66. Maximum damping is caused by the movement of shaft 73 into the position shown in FIG. 8 since the smallest diameter hole is aligned with the upper intercepting passageway 66. An O-ring 79 is held in the groove 80 and a lock nut 81 holds the knob assembly in place.

A flight angle of the threads in the threaded portion 56 of steering column of 29 degrees provided an appropriate compromise between free movement of piston 50 and a relatively large amount of movement with a turn of the handle bars. A six lead Acme thread was used. This provides a movement of 1½ inches per revolution and since the handle bars move less than 180 degrees, the amount of piston movement is slightly less than ¾ of an inch. A unit having an inside diameter of about two inches and a length between the inside surfaces of the bearing races of about four inches were found appropriate for all terrain vehicles. A piston length of about 2¼ inches was used with the smooth portion of the steering column having an outside diameter of about ¾ of an inch. The inside diameter of the unit should generally be in the range of one to four inches with two inches being preferred. The maximum length of the unit is not critical but the unit should be at least two inches between bearings with about four inches being preferred.

An alternate method of adjustment of oil flow is indicated in FIG. 7 where a knob 82 is held to a threaded bolt 83 held in sleeve 64. The end 84 of retainer pin 85 is then longitudinally adjustable by the turning knob 82. Oil may pass between end 84 and the internal surface 86 of groove 61. In this configuration, passageways 87 and 87' are provided between the end groove 61 and the lower fluid compartment 59. O-rings 52 and 52' are held in grooves 53 and 53'.

As shown in FIG. 9, a fluid passageway 88 may be formed through piston 50' eliminating the need for a fluid passageway within steering column 25'. In this configuration, no damping adjustment is provided except that provided by using oils of different viscosities.

It can be seen that the location of the steering damper within the frame of the vehicle avoids any problems of interference with other parts of the vehicle such as oil coolers, fuel tanks and the like. Furthermore, such placement makes adjustment particularly convenient for the rider since this portion of the vehicle is easily accessible to the rider.

While the invention has been discussed in detail with respect to three wheeled vehicles, it is also useful for two and four wheel vehicles. It is only necessary that the vehicle have a steering column which can be held in a housing to provide the structure necessary to hold a threaded piston and oil. The substantial advantages of the present invention namely, its exceptionally compact design and easy external adjustability are equally present for two and four wheeled vehicles.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A steering stabilizer for vehicles of the type having at least one steerable front wheel affixed to a front wheel turning assembly controlled by a steering column, said steering stabilizer providing viscous damping to the turning of the front wheel turning assembly thereof, said stabilizer comprising:
   a steering column housing affixed to the frame of a vehicle, said housing having a generally cylindrical chamber axially located therein;
   a steering column rotatably held axially within said steering column housing; said steering column being affixed to the front wheel turning assembly of the vehicle, said steering column having a threaded portion thereon within said steering column housing;
   a piston threadably held on the threaded portion of said steering column within said steering column housing, said piston being sealed within said generally cylindrical chamber and being axially slideable within said chamber said piston forming an upper fluid compartment within said chamber above said piston and a lower fluid compartment within said chamber below said piston;
   means for preventing the turning of said piston within said generally cylindrical chamber;
   oil means sealingly held within said generally cylindrical chamber said oil means completely filling said upper and lower fluid compartments; and
   oil passageway means between said upper and lower compartments, whereby the turning of said front wheel assembly causes said piston to move longitudinally within said generally cylindrical chamber forcing the oil means to pass through said passageway causing viscous damping to the turning of the front wheel assembly.

2. The steering stabilizer of claim 1 wherein said thread portion has a flight of about 29 degrees.

3. The steering stabilizer of claim 1 wherein the inside diameter of said generally cylindrical chamber of said steering column housing and frame member is between about one and four inches.

4. The steering stabilizer of claim 3 wherein said inside diameter is about two inches.

5. The steering stabilizer of claim 1 wherein the length of said generally cylindrical chamber of said steering column housing is at least about two inches long.

6. The steering stabilizer of claim 5 wherein said length is about four inches.

7. The steering stabilizer of claim 1 wherein said oil passageway means comprises an axial bore in said steering column, said axial bore having a first intercepting passageway leading between said axial bore and said upper fluid compartment and a second intercepting passageway between said axial bore and said lower fluid compartment.

8. The steering stabilizer of claim 1 wherein said oil passageway means comprises a longitudinal bore formed through said piston from the end thereof which is adjacent said upper fluid compartment to the end thereof which is adjacent said lower fluid compartment.

9. The steering stabilizer of claim 1 wherein the size of said oil passageway is adjustable from outside of the stabilizer.

10. The steering stabilizer of claim of claim 7 wherein the size of said oil passageway is adjustable from outside of the stabilizer.

11. The steering stabilizer of claim 10 wherein the size of said oil passageway is adjusted by the turning of a shaft axially held in a passageway formed in the upper portion of said steering column, said shaft having valve means held near the lower end of said shaft.

12. The steering stabilizer of claim 11 wherein said valve means comprises a plurality of generally horizontal holes, each hole being of different diameter, one of which being selectively held in alignment with said first intercepting passageway and each of said generally horizontal holes being connected to an axial passageway in said shaft which, in turn is connected to the axial bore in the steering column.

13. The steering stabilizer of claim 12 wherein said valve means has four generally horizontal holes.

14. The steering stabilizer of claim 1 wherein said means for preventing the turning of said piston within said generally cylindrical chamber comprises a groove formed along a portion of the outer surface of said piston and an alignment bolt extending through the side of said steering column housing and frame member, the interior end of said bolt snugly fitting in said groove.

15. The steering stabilizer of claim 14 wherein said oil passageway is located between the groove formed along said piston and the end of said alignment bolt.

16. The steering stabilizer of claim 15 wherein the distance between said end of said alignment bolt and the groove is adjustable from the exterior of the stabilizer whereby the damping resistance to turning of the front wheel assembly is increased as the distance between the end of the bolt and the groove is decreased.

* * * * *